US010638815B2

(12) United States Patent
Lee

(10) Patent No.: US 10,638,815 B2
(45) Date of Patent: May 5, 2020

(54) BUCKLE JOINT STRUCTURE

(71) Applicant: TAIWAN OASIS TECHNOLOGY CO., LTD., New Taipei (TW)

(72) Inventor: Wei-Long Lee, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 128 days.

(21) Appl. No.: 16/017,017

(22) Filed: Jun. 25, 2018

(65) Prior Publication Data

US 2019/0387842 A1 Dec. 26, 2019

(51) Int. Cl.

| | |
|---|---|
| ***A44B 11/00*** | (2006.01) |
| ***F16B 45/04*** | (2006.01) |
| *F21V 17/10* | (2006.01) |
| *B65D 43/02* | (2006.01) |
| *B65D 43/08* | (2006.01) |

(52) U.S. Cl.

CPC ............ *A44B 11/005* (2013.01); *F16B 45/04* (2013.01); *B65D 43/0216* (2013.01); *B65D 43/08* (2013.01); *B65D 2543/00092* (2013.01); *B65D 2543/00518* (2013.01); *F21V 17/104* (2013.01)

(58) Field of Classification Search

CPC ........ A44B 11/005; B65D 2543/00092; B65D 2543/00518; B65D 43/0216; B65D 43/08; F16B 45/04; F21V 17/104

See application file for complete search history.

(56) References Cited

U.S. PATENT DOCUMENTS

| | | | | | |
|---|---|---|---|---|---|
| 2,168,421 | A * | 8/1939 | Reynolds | A47H 1/13 | 248/263 |
| D162,292 | S * | 3/1951 | Eckert | D25/55 | |
| D165,515 | S * | 12/1951 | Eckert | D25/55 | |
| 3,268,106 | A * | 8/1966 | Satz | B65D 21/0219 | 220/789 |
| 3,430,447 | A * | 3/1969 | Boniface | E04D 13/0641 | 405/122 |
| 4,252,265 | A * | 2/1981 | Brundige | B65D 21/0222 | 206/508 |
| 4,384,605 | A * | 5/1983 | Schaeffer | E06B 9/38 | 160/178.1 R |
| 4,597,502 | A * | 7/1986 | Troughton | B65D 43/0218 | 220/319 |
| 4,836,407 | A * | 6/1989 | Bruce | B29C 51/00 | 220/276 |
| 4,934,554 | A * | 6/1990 | Edwards | B65D 43/0249 | 215/253 |

(Continued)

*Primary Examiner* — Robert Sandy
*Assistant Examiner* — David M Upchurch
(74) *Attorney, Agent, or Firm* — Demian K. Jackson; Jackson IPG PLLC

(57) ABSTRACT

A buckle joint structure has a first body, a second body and a buckle module with a cross section of a C-shape. A first flange of the first body is fixed or buckled to a second flange of the second body via the buckle module with the cross section of the C-shape. When assembling, merely a sliding manner is required to make the first flange of the first body and the second flange of the second body buckled to the buckle module. When detaching, merely a sliding manner is required to withdraw the buckle module away from the first body and the second body. Thus, the buckle joint structure is easily assembled or detached without an extra tool or help of another person.

20 Claims, 6 Drawing Sheets

(56) References Cited

U.S. PATENT DOCUMENTS

| | | | | | |
|---|---|---|---|---|---|
| 4,966,294 | A * | 10/1990 | Mack | B65D 43/0249 220/260 |
| 5,152,417 | A * | 10/1992 | Gallagher | B21D 51/26 220/792 |
| 5,573,134 | A * | 11/1996 | Chenault | B65B 7/28 220/276 |
| 5,803,144 | A * | 9/1998 | Ives | A47H 19/00 160/38 |
| D411,067 | S * | 6/1999 | Cadorette | D25/48.4 |
| 6,245,277 | B1 * | 6/2001 | Diamond | B65D 43/0206 264/328.1 |
| D600,058 | S * | 9/2009 | Sudano | D6/580 |
| 2003/0029822 | A1 * | 2/2003 | Fitzsimmons | A47H 1/00 211/105.1 |
| 2009/0236055 | A1 * | 9/2009 | Lasch | A47H 2/00 160/368.1 |
| 2012/0314354 | A1 * | 12/2012 | Rayner | H05K 5/061 361/679.01 |
| 2013/0206763 | A1 * | 8/2013 | Sinn | B65D 15/22 220/240 |
| 2015/0146438 | A1 * | 5/2015 | Rauer-Hans | F21V 31/005 362/374 |
| 2019/0150650 | A1 * | 5/2019 | Mullet | A47H 3/02 |

* cited by examiner

BUCKLE JOINT STRUCTURE

BACKGROUND

1. Technical Field

The present disclosure relates to a buckle joint structure, in particular, to a buckle module which fixes and buckles a first body and a second body.

2. Description of Related Art

Generally, a manner for fixing and buckling two objects is usually to form a top buckle unit and a box integrally (for example, to buckle and engage a cover and a box body of a box), and to simultaneously form a bottom buckle unit and the box integrally. The box and a box body are engaged to each other by buckling and fixing the top buckle unit and the bottom buckle unit. However, the top buckle unit and the bottom buckle unit may be damaged due to repeated mutual buckling operations. When the top buckle unit or the bottom buckle unit is damaged, the top buckle unit or the bottom buckle unit is not independently replaced by a new one, and thus the box should be discarded, which causes waste and does not have economic benefits.

For example, TW patent M548766 discloses a projection lamp comprising an independent lamp case, a glass plate (i.e. lamp mask) and a buckle unit. When assembling, the buckle unit and the glass plate are buckled to the lamp case. The buckle unit has a buckle portion corresponding to a screwing portion, and the buckle portion is hooked to a second section of the glass plate, such that the glass plate tightly covers the lamp case. However, the buckle portion and the screwing portion need an extra tool (for example, a screwdriver) for assembling and detaching. When assembling, a left hand should be used to hold the lamp case, a right hand should be used to hold the glass plate, and help of another person is also required to drive the screwdriver to rotate the screwing portion, so as to buckle the buckle unit simultaneously to the lamp case and the glass plate. In the similar manner, when detaching the projection lamp to replace one inner component, the help of another person is also required to remove the buckle unit, which causes inconvenience to the user.

Thus, how to facilitate convenience of assembling and detaching the apparatus by a novel hardware design, and how to efficiently decrease the assembling cost and time consumption, are still issues which the industry developers and researchers continuously try to overcome and solve.

SUMMARY

One main objective of the present disclosure is used to provide a buckle joint structure which a user can easily achieve assembling and detaching without any extra tool.

To achieve one objective of the present disclosure, buckle joint structure, at least comprising: a first body, having a first flange formed with a first hook, wherein the first hook is bent toward a first direction and has a first curvature, to form a first accommodation space; a second body, having a second flange; and a buckle module, comprising a first section, a second section and a third section, wherein two ends of the second section are respectively coupled to the first section and the third section, a terminal end of the first section is formed with a first buckle portion; wherein the first buckle portion is accommodated in the first accommodation space; sequentially, the first buckle portion presses the first hook of the first flange, the first hook presses the second flange, and the second flange presses the third section.

According to the above buckle joint structure, a cross section of the buckle module is a C-shape, the C-shape comprises a top portion, a side portion and a bottom portion, the top portion is the first section, the side portion is the second section, and the bottom portion is the third section; the first hook is a hooked arc extending forward the first direction to form a groove, and the first accommodation space is formed by the groove; the second flange is a plate; the first buckle portion is an inverted triangle extending forward a second direction being opposite to the first direction; a lower vertex at top of the inverted triangle presses a groove bottom of the groove, the groove presses the plate, and the plate presses the bottom portion.

Accordingly, the buckle joint structure of the present disclosure mainly uses the buckle module with the cross section of the C-shape to fix and buckle the first flange of the first body to the second flange of the second body. When assembling, merely a sliding manner is required to make the first flange of the first body and the second flange of the second body buckled to the buckle module. When detaching, merely a sliding manner is required to withdraw the buckle module away from the first body and the second body. Thus, the buckle joint structure is easily assembled or detached without an extra tool or help of another person.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
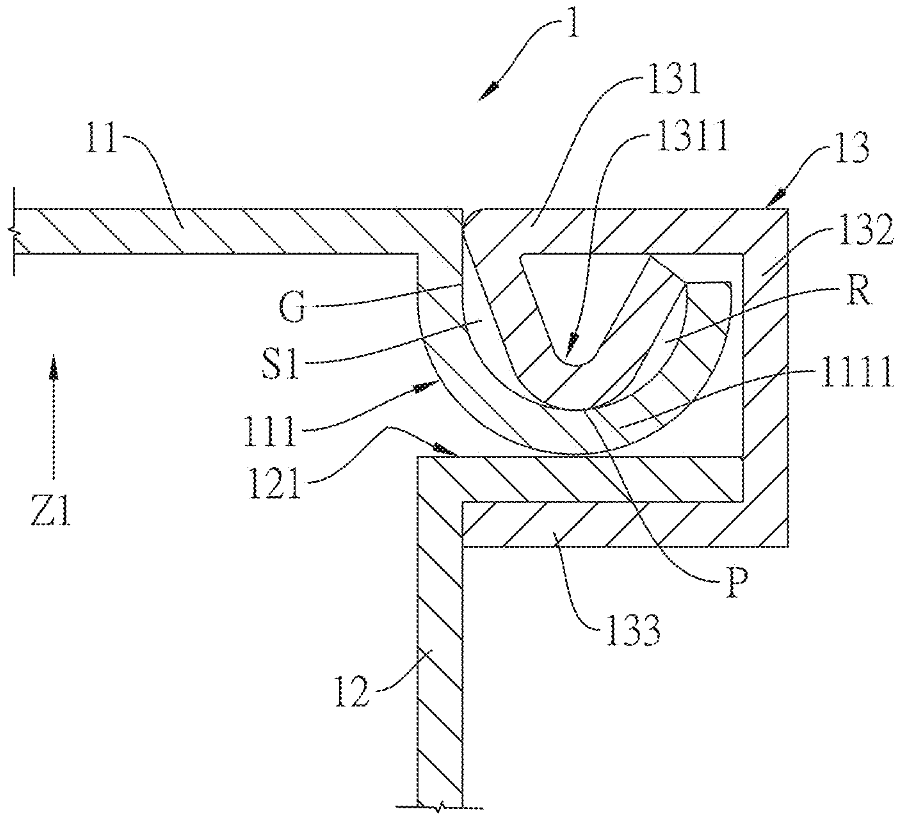
FIG. 1 is a schematic diagram showing buckling of a whole structure associated with a buckle joint structure according to a first embodiment of the present disclosure.

To facilitate understanding of the present disclosure, the following descriptions are provided to illustrate exemplary embodiments of the present disclosure together with drawings. It is noted that the following drawings are used for illustration of the present disclosure and not intended to limit the actual dimension, ratio and alignment. Therefore, ratios and allocations of the components in the drawings will not limit the scope of the present disclosure.

First, referring to FIG. 1, a buckle joint structure (1) of the present disclosure at least comprises: a first body (11), a second body (12) and a buckle module (13).

A first flange (111) is disposed on periphery of the first body (11), and the first flange (111) is formed to have a first hook (1111), and the first hook (1111) is bent toward a first direction (Z1) and has a first curvature, to form a first accommodation space (S1). A second flange (121) is disposed on periphery of the second body (12). Preferably, the first body (11), the first flange (111) and the first hook (1111) are formed integrally; more preferably, the second body (12) and the second flange (121) are formed integrally.

The buckle module (13) comprises a first section (131), a second section (132) and a third section (133), wherein two ends of the second section (132) are respectively coupled to the first section (131) and the third section (133), a terminal end of the first section (131) is formed with a first buckle portion (1311). The first buckle portion (1311) is accommodated in the first accommodation space (S1). Sequentially, the first buckle portion (1311) presses the first hook (1111) of the first flange (111), the first hook (1111) presses the second flange (121), and the second flange (121) presses the third section (133), and thus by using the buckle module (13), the first flange (111) of the first body (11) is buckled and fixed to the second flange (121) of the second body (12). Preferably, the first section (131), the second section (132) and the third section (133) are formed integrally; most preferably, the first section (131), the second section (132), the third section (133) and the first buckle portion (1311) are formed integrally.

In the first embodiment, the buckle module (13) has a cross section of a C-shape, the C-shape comprises a top portion, a side portion and a bottom portion, the top portion is the first section (131), the side portion is the second section (132), and the bottom portion is the third section (133). The first direction (Z1) faces upward. The first hook (1111) is a hooked arc extending upward to form a groove (G), and in other words, the first hook (1111) is the hooked arc extending forward the first direction (Z1) to form a groove (G). The first accommodation space (S1) is formed by the groove (G). The second flange (121) is a plate. The first buckle portion (1311) is an inverted triangle extending downward, and in other words, the first buckle portion (1311) is the inverted triangle extending forward a second direction (Z2) being opposite to the first direction (Z1). A lower vertex (P) at top of the inverted triangle presses a groove bottom of the groove (G), the groove (G) presses the plate, and the plate presses the bottom portion. Thus, by using the C-shape, the groove (G) is fixed and buckled to the plate. Since the contacting area that the lower vertex (P) of the inverted triangle contacts the groove bottom of the groove (G) is small, the lower vertex (P) of the inverted triangle generates a large pressing force downward, and in other words, the pressing force is parallel to the first direction (Z1), or the pressing force is opposite to the first direction (Z1). Thus, the C-shape can stably fix and buckle the first body (11) and the second body (12).

Addition, in the first embodiment, the inverted triangle and the groove (G) of the hooked arc have a gap (R) therebetween, and in other words, the first buckle portion (1311) and the first hook (1111) have the gap (R) therebetween. The gap (R) can facilitate the first buckle portion (1311) to be assembled into the first accommodation space (S1) of the first hook (1111), and also facilitate the first buckle portion (1311) to be removed away from the accommodation space (S1) of the first hook (1111). That is, the assembling convenience of the first body (11), the second body (12) and the buckle module (13) is increased, and the detaching convenience of the first body (11), the second body (12) and the buckle module (13) is also increased.

Figure 2:
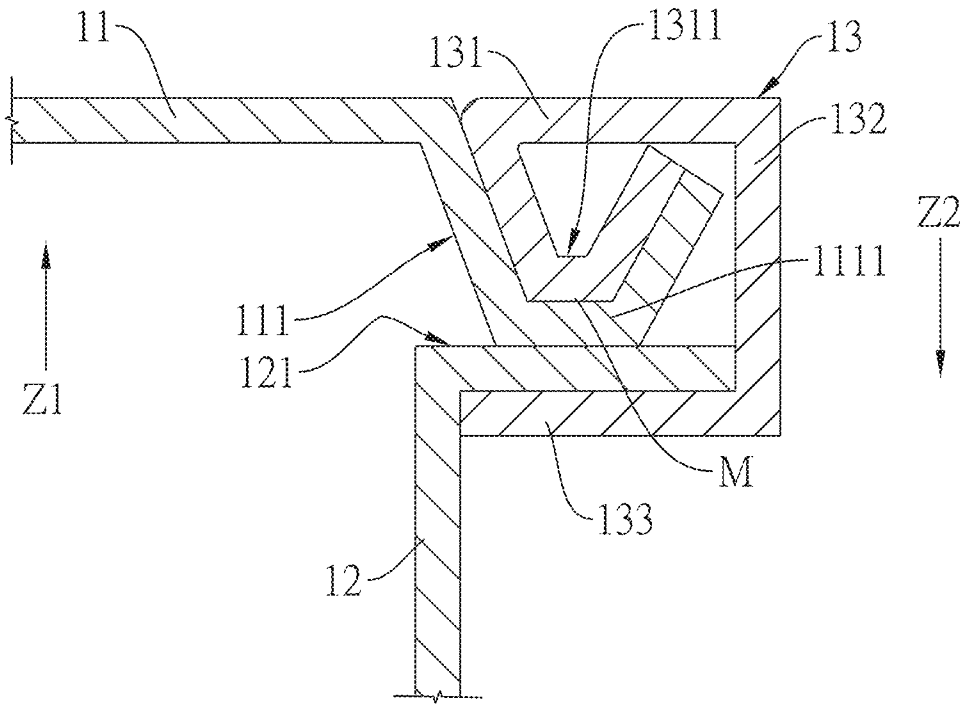
FIG. 2 is a schematic diagram showing buckling of a whole structure associated with a buckle joint structure according to a second embodiment of the present disclosure.

Referring to FIG. 2, FIG. 2 illustrates a second embodiment of the present disclosure. The differences of the first and second embodiments are illustrated as follows. The first hook (1111) is hooked upward and formed with the groove (G), and in other words, the first hook (1111) is hooked forward the first direction (Z1) to form the groove (G). The first buckle portion (1311) is an inverted trapezoid downward, and in other words, the first buckle portion (1311) is the inverted trapezoid extending forward the second direction (Z2). A lower side (M) of the inverted trapezoid is attached to and presses the groove bottom of the groove (G), the groove (G) presses the plate, and the plate presses the bottom portion, such that the C-shape buckles and fixes the groove (G) to the plate. In other words, the groove (G) presses the second flange (121), and the second flange (121) presses the third section (133). The descriptions of the second embodiment same as those of the first embodiment herein are not described again. Preferably, two waists and the lower side (M) of the inverted trapezoid are attached to the groove (G), so as to increase a contacting area which the first buckle portion (1311) contacts the first hook (1111). Accordingly, stability which the first body (11), the second body (12) and buckle module (13) have been assembled is increased.

Figure 3:
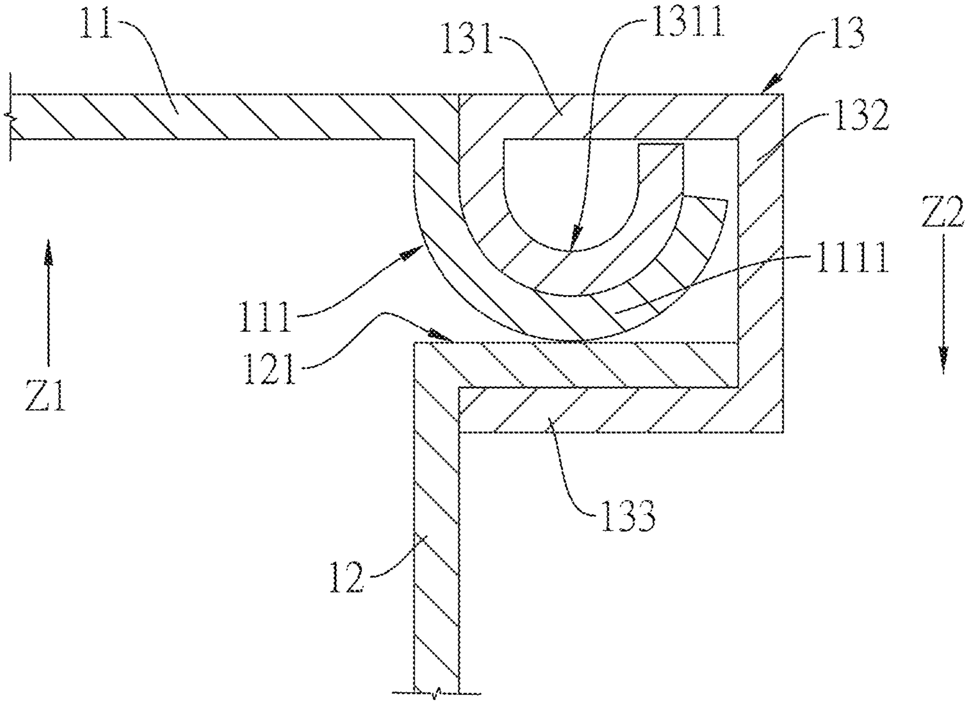
FIG. 3 is a schematic diagram showing buckling of a whole structure associated with a buckle joint structure according to a third embodiment of the present disclosure.

Referring to FIG. 3, FIG. 3 illustrates a third embodiment of the present disclosure. The differences of the second and third embodiments are illustrated as follows. The first hook (1111) is a hooked arc being extending upward to form the groove (G), and that is, the first hook (1111) is the hooked arc being extending forward the first direction (Z1) and formed with the groove (G). The first hook (1111) and the first buckle portion (1311) are hooked arcs extending upward, and the hooked arc associated with the first buckle portion (1311) is attached to the groove (G). In other words, the first hook (1111) and the first buckle portion (1311) are hooked arcs extending forward the first direction (Z1). The descriptions of the third embodiment same as those of the first and second embodiments herein are not described again. Compared to the inverted trapezoid of the second embodiment, the first hook (1111) and the first buckle portion (1311) in the third embodiment are hooked arcs being attached to each other, such that sliding smoothness of assembling the first body (11), the second body (12) and the buckle module (13) is increased as well as the stability which the first body (11), the second body (12) and buckle module (13) have been assembled. In addition, preferably, a curvature of the hooked arc associated with the first buckle portion (1311) is larger than or equal to the first curvature; more preferably, the curvature of the hooked arc associated with the first buckle portion (1311) is equal to the first curvature. In particular, when the curvature of the hooked arc associated with the first buckle portion (1311) is equal to the first curvature, the first hook (1111) and the first buckle portion (1311) can be completely attached to each other, so as to increase the stability which the first body (11), the second body (12) and buckle module (13) have been assembled.

Figure 4:
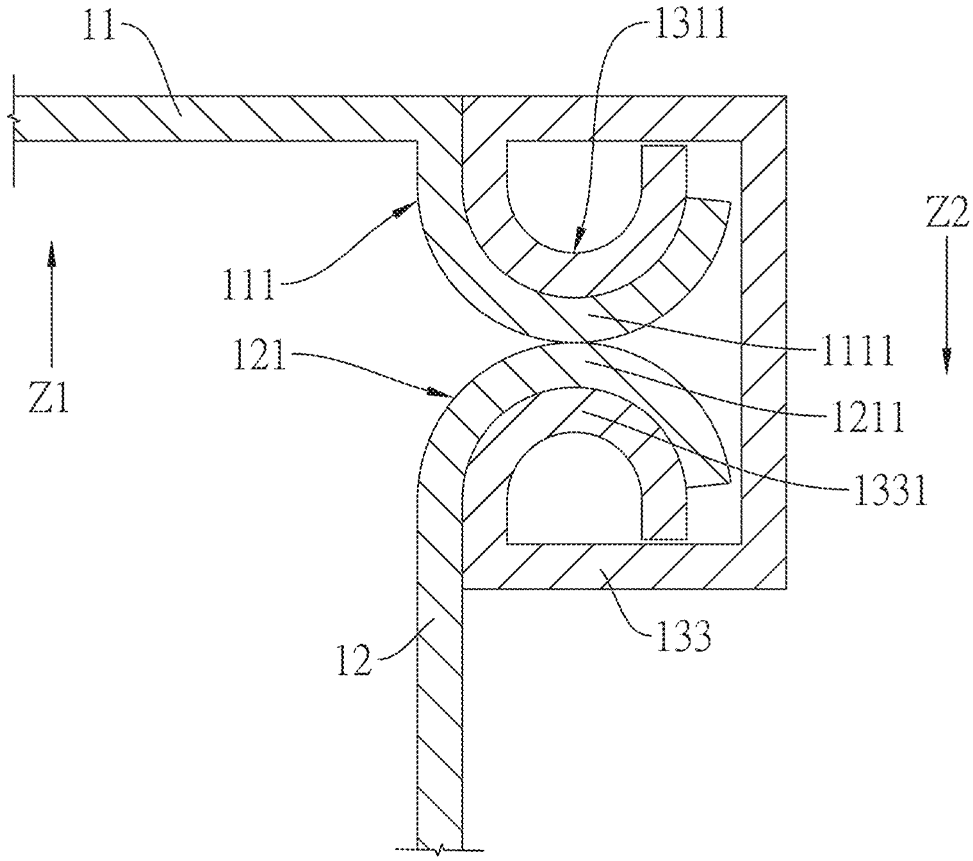
FIG. 4 is a schematic diagram showing buckling of a whole structure associated with a buckle joint structure according to a fourth embodiment of the present disclosure.

Referring to FIG. 4, FIG. 4 illustrates a fourth embodiment of the present disclosure. The differences of the third and fourth embodiments are illustrated as follows. The second flange (121) is formed with a second hook (1211), the second hook (1211) is bent forward the second direction (Z2) and has a second curvature, so as to form a second accommodation space (S2) (see FIG. 5). The terminal end of the third section (133) is formed with a second buckle portion (1331) being bent forward the second direction (Z2), the second buckle portion (1331) is accommodated in the second accommodation space (S2), and sequentially, the first buckle portion (1311) presses the first hook (1111) of the first flange (111), the first hook (1111) presses the second hook (1211) of the second flange (121), and the second hook (1211) presses the second buckle portion (1331) of the third section (133), such that the buckle module (13) can fix and buckle the first flange (111) of the first body (11) to the second flange (121) of the second body (12). In the fourth embodiment, the first hook (1111) and the first buckle portion (1311) are hooked arcs being extending forward the first direction (Z1), and the hooked arc associated with the first buckle portion (1311) is attached to the first hook (1111). The second hook (1211) and the second buckle portion (1331) are hooked arcs extending forward the second direction (Z2), and the hooked arc associated with the second hook (1211) is attached to the second buckle portion (1331). Most preferably, the first section (131), the second section (132), the third section (133), the first buckle portion (1311) and the second buckle portion (1331) are formed integrally. In addition, preferably, the curvature of the hooked arc associated with the first buckle portion (1311) is larger than or equal to the second curvature; more preferably, the curvature of the hooked arc associated with the first buckle portion (1311) is equal to the second curvature. In particular, when the curvature of the hooked arc associated with the first buckle portion (1311) is equal to the second curvature, the second hook (1211) and the second buckle portion (1331) are completely attached to each other, so as to increase the stability which the first body (11), the second body (12) and buckle module (13) have been assembled.

Of course, most preferably, the curvature of the hooked arc associated with the first buckle portion (1311), the first curvature and a curvature of the hooked arc associated with the second buckle portion (1331) are equal to the second curvature.

Figure 5:
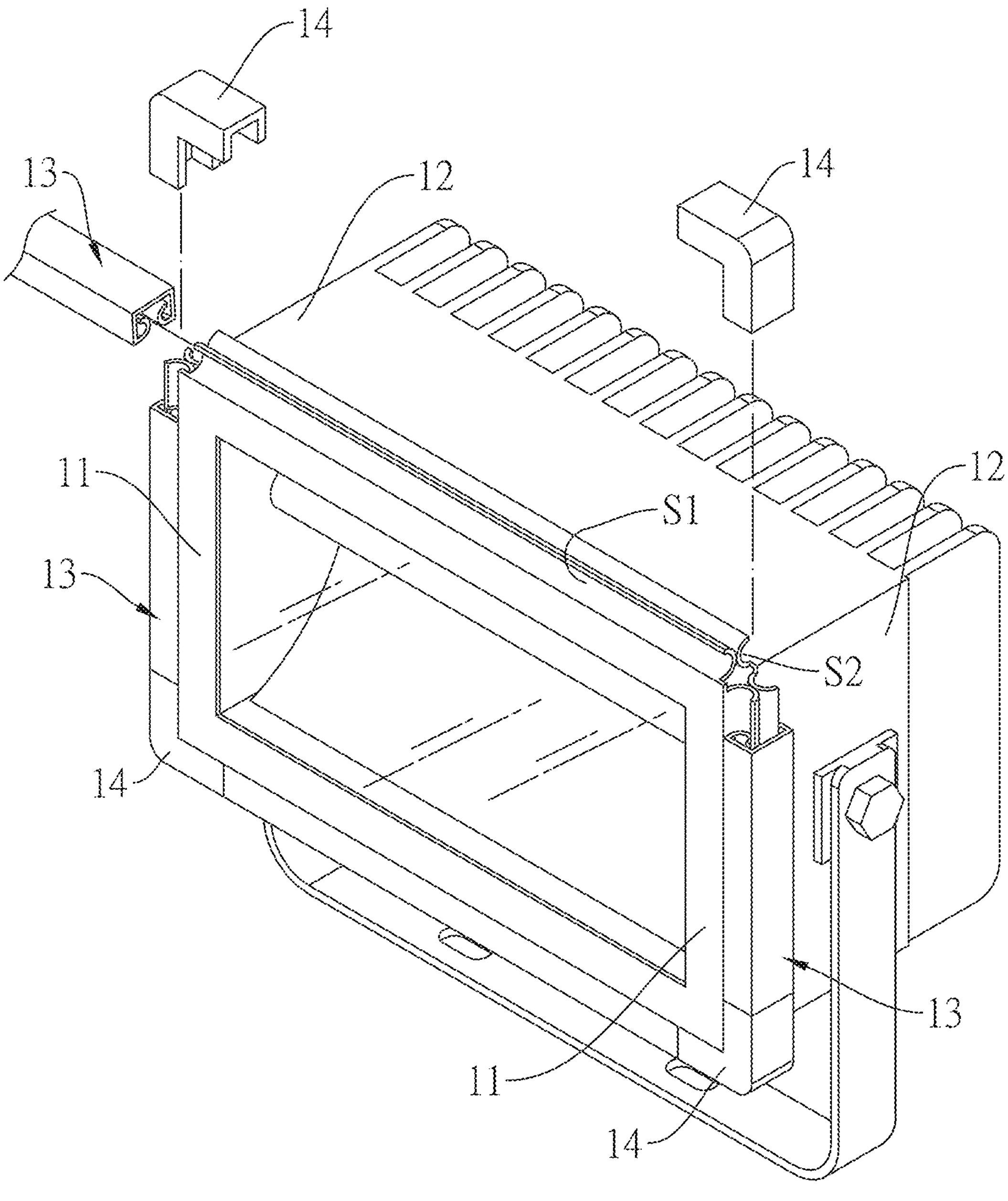
FIG. 5 is a schematic diagram showing a lamp application of the buckle joint structure provided by the present disclosure.
Figure 6:
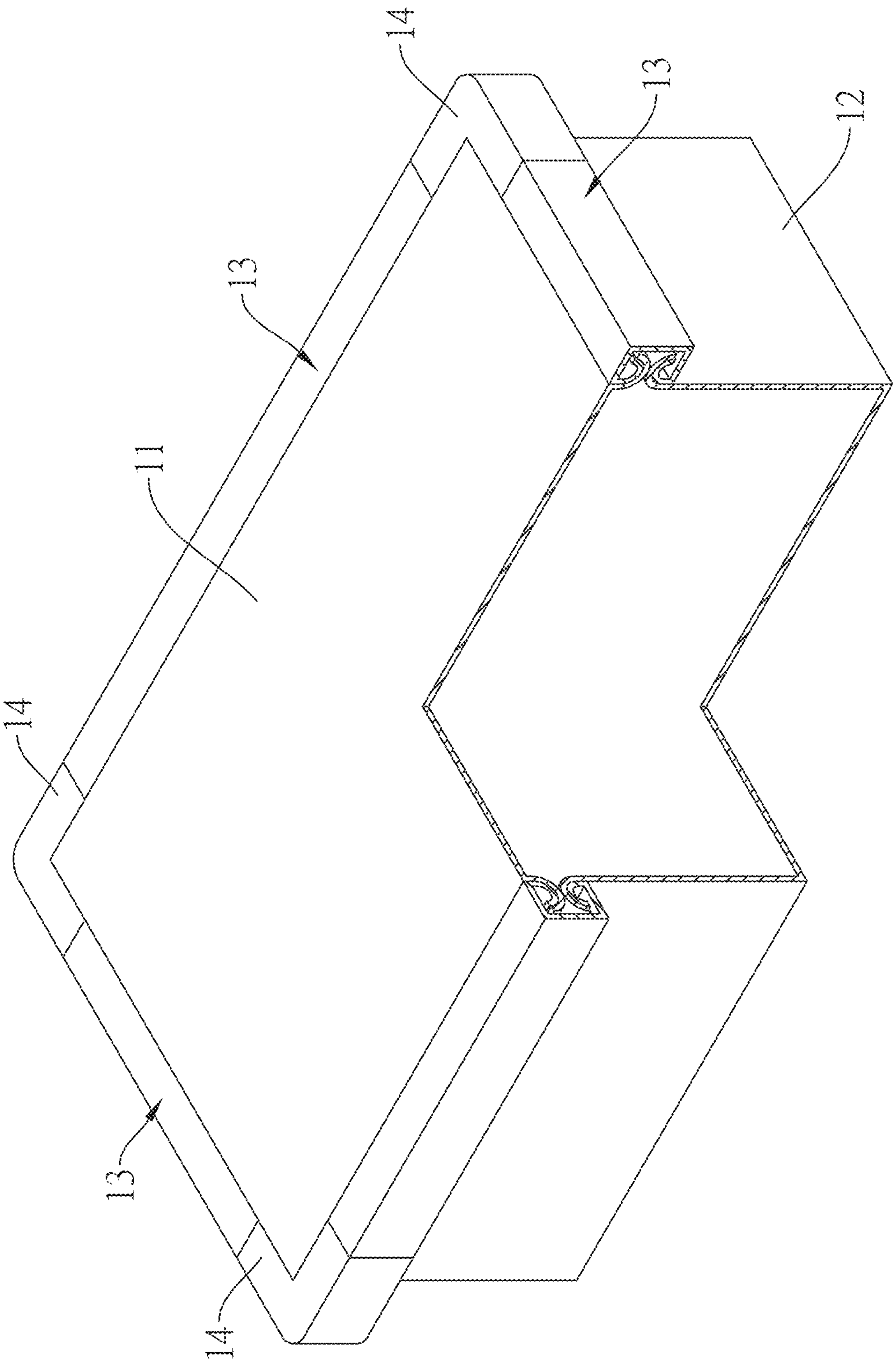
FIG. 6 is a schematic diagram showing a storage box application of the buckle joint structure provided by the present disclosure.

Referring to FIG. 5 and FIG. 6 at the same time, FIG. 5 and FIG. 6 show embodiments of a lamp application (FIG. 5) and a storage box application (FIG. 6) associated with the buckle joint structure (1). In the embodiment of the lamp application, further referring to FIG. 4, the first body (11) of the buckle joint structure (1) is a lamp mask, and the second body (12) is a lamp case, the lamp mask can be fixed or buckled to the lamp case by using the buckle module (13), wherein the lamp case is installed with an electronic circuit (not shown in the drawings) and a bulb (not shown in the drawings). When assembling the lamp, merely a sliding manner is used to buckle the lamp mask and the lamp case via the buckle module (13), and that is, the assembly is easily completed without any extra tool. In the similar manner. In the similar manner, when detaching the lamp, merely a sliding manner is used to withdraw the buckle module (13) away from the lamp mask and lamp case, and that is, the detachment is easily completed without any extra tool. In the embodiment of the storage box application, further referring to the fourth embodiment (i.e. FIG. 4), the first body (11) of the buckle joint structure (1) is a box cover, the second body (12) is a box body, and the box cover is fixed or buckled to the box body via the buckle module (13).

Additionally, for the objective of closing edge, the buckle joint structure (1) is further formed with at least one corner portion (14), and the corner portion (14) is correspondingly bulked to the first body (11) and the second body (12). Therefore, edges of the four corners of the lamp or the storage box can be closed actually.

According to the descriptions of the embodiment, the present disclosure has the advantages as follows. The buckle joint structure of the present disclosure mainly uses the buckle module with the cross section of the C-shape to fix and buckle the first flange of the first body to the second flange of the second body. When assembling, merely a sliding manner is required to make the first flange of the first body and the second flange of the second body buckled to the buckle module. When detaching, merely a sliding manner is required to withdraw the buckle module away from the first body and the second body. Thus, the buckle joint structure is easily assembled or detached without an extra tool or help of another person.

To sum up, the buckle joint structure provided by the present disclosure have not been anticipated by publications or used in public, which meet patentability of the invention. Examination of the present disclosure is respectfully requested, as well as allowance of the present disclosure.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A buckle joint structure, at least comprising:

a first body, having a first flange formed with a first hook, wherein the first hook is bent toward a first direction, to form a first accommodation space;

a second body, having a second flange; and a buckle module, comprising a first section, a second section and a third section, wherein two ends of the second section are respectively coupled to the first section and the third section, the first section is formed with a first buckle portion;

wherein the first buckle portion is accommodated in the first accommodation space; sequentially, the first buckle portion presses the first hook of the first flange, the first hook presses the second flange, and the second flange presses the third section.

2. The buckle joint structure according to claim 1, wherein the first flange is disposed on periphery of the first body.

3. The buckle joint structure according to claim 1, wherein the second flange is disposed on periphery of the second body.

4. The buckle joint structure according to claim 1, wherein the first body, the first flange and the first hook are integrally formed.

5. The buckle joint structure according to claim 1, wherein the second body and the second flange are integrally formed.

6. The buckle joint structure according to claim 1, wherein the first section, the second section, the third section and the first buckle portion are integrally formed.

7. The buckle joint structure according to claim 1, wherein the first flange is disposed at periphery of the first body, and the first body, the first flange and the first hook are integrally formed; the second flange is disposed at periphery of the second body, and the second body and the second flange are integrally formed.

8. The buckle joint structure according to claim 7, wherein the first section, the second section, the third section and the first buckle portion are integrally formed.

9. The buckle joint structure according to claim 1, wherein a cross section of the buckle module is a C-shape, the C-shape comprises a top portion, a side portion and a bottom portion, the top portion is the first section, the side portion is the second section, and the bottom portion is the third section; the first hook is a hooked arc extending forward the first direction to form a groove, and the first accommodation space is formed by the groove; the second flange is a plate; the first buckle portion is an inverted triangle extending forward a second direction being opposite to the first direction; a lower vertex at top of the inverted triangle presses a groove bottom of the groove, the groove presses the plate, and the plate presses the bottom portion.

10. The buckle joint structure according to claim 9, wherein the first buckle portion and the first hook have a gap therebetween.

11. The buckle joint structure according to claim 1, wherein the first hook is a hooked arc extending forward the first direction to form a groove; the first buckle portion is an inverted trapezoid extending forward a second direction being opposite to the first direction; a lower side of the inverted trapezoid is attached to and presses a groove bottom of the groove, the groove presses the second flange, and the second flange presses the third section.

12. The buckle joint structure according to claim 1, wherein the first hook is a hooked arc extending forward the first direction to form a groove, the first hook and the first buckle portion are hooked arcs extending forward the first direction, and the hooked arc associated with the first buckle portion is attached to the groove.

13. The buckle joint structure according to claim 12, wherein the first hook has a first curvature and a curvature of the hooked arc associated with the first buckle portion is larger than the first curvature.

14. The buckle joint structure according to claim 12, wherein the first hook has a first curvature and a curvature of the hooked arc associated with the first buckle portion is equal to the first curvature.

15. The buckle joint structure according to claim 1, wherein the second flange is formed to have a second hook, the second hook is bent forward a second direction and has a second curvature, so as to from a second accommodation space, wherein the second direction is opposite to the first direction; a terminal end of the third section is formed to have a second buckle portion bent forward the second direction, the second buckle portion is accommodated in the second accommodation space, and sequentially, the first buckle portion presses the first hook of the first flange, the first hook presses the second hook of the second flange, and the second hook presses the second buckle portion of the third section.

16. The buckle joint structure according to claim 15, wherein the first hook and the first buckle portion are hooked arcs extending forward the first direction, and the hooked arc associated with the first buckle portion is attached to the first hook; the second hook and the second buckle portion are hooked arcs extending forward the second direction, and the hooked arc associated with the second hook is attached to the second buckle portion.

17. The buckle joint structure according to claim 16, wherein a curvature of the hooked arc associated with the second buckle portion is larger than or equal to the second curvature.

18. The buckle joint structure according to claim 16, wherein the first hook is a hooked arc extending forward the first direction to form a groove, the first hook and the first buckle portion are hooked arcs extending forward the first direction, and the hooked arc associated with the first buckle portion is attached to the groove; the first hook has a first curvature and a curvature of the hooked arc associated with the first buckle portion is larger than or equal to the first curvature, a curvature of the hooked arc associated with the second buckle portion is larger than or equal to the second curvature.

19. The buckle joint structure according to claim 18, wherein the curvature of the hooked arc associated with the first buckle portion, the first curvature and the curvature of the hooked arc associated with the second buckle portion are equal to the second curvature.

20. The buckle joint structure according to claim 15, wherein the first section, the second section, the third section, the first buckle portion and the second buckle portion are formed integrally.

* * * * *